(12) United States Patent
Mere

(10) Patent No.: US 10,077,119 B2
(45) Date of Patent: Sep. 18, 2018

(54) FLIGHT MANAGEMENT ASSEMBLY FOR AN AIRCRAFT AND METHOD FOR MONITORING SUCH AN ASSEMBLY

(71) Applicant: AIRBUS OPERATIONS (S.A.S.), Toulouse (FR)

(72) Inventor: Jean-Claude Mere, Verfeil (FR)

(73) Assignee: Airbus Operations (S.A.S.), Toulouse (FR)

( * ) Notice: Subject to any disclaimer, the term of this patent is extended or adjusted under 35 U.S.C. 154(b) by 148 days.

(21) Appl. No.: 15/203,328

(22) Filed: Jul. 6, 2016

(65) Prior Publication Data

US 2017/0008640 A1    Jan. 12, 2017

(30) Foreign Application Priority Data

Jul. 6, 2015  (FR) ...................... 15 56385

(51) Int. Cl.
| | |
|---|---|
| G01C 23/00 | (2006.01) |
| G05D 1/00 | (2006.01) |
| G05D 3/00 | (2006.01) |
| G06F 7/00 | (2006.01) |
| G06F 17/00 | (2006.01) |
| B64D 45/00 | (2006.01) |
| G06F 11/16 | (2006.01) |
| G08G 5/00 | (2006.01) |

(52) U.S. Cl.
CPC .......... *B64D 45/00* (2013.01); *G05D 1/0077* (2013.01); *G06F 11/1641* (2013.01); *G08G 5/0047* (2013.01)

(58) Field of Classification Search
CPC . G05D 1/0077; G06F 11/1641; G08G 5/0047
USPC ............................................................ 701/3
See application file for complete search history.

(56) References Cited

U.S. PATENT DOCUMENTS

2012/0150366 A1   6/2012  Potagnik et al.
2012/0150368 A1   6/2012  Potagnik et al.

OTHER PUBLICATIONS

French Search Report for Application No. 1556385 dated Jun. 1, 2016.

*Primary Examiner* — Maceeh Anwari
(74) *Attorney, Agent, or Firm* — Jenkins, Wilson, Taylor & Hunt, P.A.

(57) ABSTRACT

A flight management assembly for an aircraft and method for monitoring such an assembly. The flight management assembly includes two guidance systems each provided with a flight management system, the flight management systems being independent, each of the flight management systems carrying out at least one calculation of roll commands for the aircraft, the flight management assembly also comprising a data generating unit, preferably forming part of a guidance computer, for calculating a roll command and a monitoring unit for carrying out a monitoring of the roll commands calculated by the two flight management systems and by the data generating unit in such a way as to be able to detect and identify a defective flight management system.

15 Claims, 2 Drawing Sheets

FLIGHT MANAGEMENT ASSEMBLY FOR AN AIRCRAFT AND METHOD FOR MONITORING SUCH AN ASSEMBLY

CROSS-REFERENCE TO RELATED APPLICATION

This application claims the benefit of and priority to French patent application number 15 56385 filed on Jul. 6, 2015, the entire disclosure of which is incorporated by reference herein.

TECHNICAL FIELD

The present disclosure relates to a flight management assembly for an aircraft, in particular for a transport aircraft, and a method for monitoring such a flight management assembly.

Although not exclusively, the present disclosure applies more particularly to an aircraft implementing operations having required navigation performance with authorization required, of the RNP AR (Required Navigation Performance with Authorization Required) type. These RNP AR operations are based on area navigation of the RNAV (aRea NAVigation) type and on operations with required navigation performance of the RNP (Required Navigation Performance) type. They have the particular feature of necessitating special authorization in order to be able to be used on an aircraft.

It is known that the RNP concept corresponds to area navigation, to which are added (on board the aircraft) monitoring and a warning which make it possible to ensure that the aircraft remains in a corridor, called the RNP corridor, around a reference trajectory. Relief or other aircraft are potentially outside of this corridor. The performance required for an operation of the RNP type is defined by an RNP value which represents the half-width (in nautical miles: NM) of the corridor around the reference trajectory, within which the aircraft must remain for 95% of the time during the operation. A second corridor (around the reference trajectory) with a half-width of twice the RNP value is also defined. The probability that the aircraft leaves this second corridor must be less than $10^{-7}$ per hour of flight.

The concept of RNP AR operations is even more constrictive. RNP AR procedures are in fact characterized by:
RNP Values:
  which are less than or equal to 0.3 NM during approach, and which can drop to 0.1 NM; and
  which are strictly less than 1 NM during departure and during a go-around, and which can also drop to 0.1 NM;
a final approach segment which can be curved; and
obstacles (mountains, traffic, . . . ) which can be situated at twice the RNP value with respect to the reference trajectory whilst, for usual RNP operations, an additional margin is provided with respect to obstacles.

Air traffic authorities have defined, for RNP AR operations, a target level of safety TLS (Target Level of Safety) such that the probability of the aircraft leaving the corridor of half-width D=2. RNP must not exceed $10^{-7}$ per hour of flight.

The present disclosure applies to a flight management assembly comprising two guidance systems, each guidance system provided with a flight management system of the FMS (Flight Management System) type for the implementation of RNP AR operations.

BACKGROUND

The items of equipment installed on board an aircraft and notably the flight management assembly must achieve the target level of safety, if the aircraft must implement required navigation performance with authorization required operations of the RNP AR type.

The objective is to have the capability of flying the RNP AR procedures with RNP values down to 0.1 NM, and to do so without restriction (in a normal situation and in the case of a failure) during departure, approach and go-around.

In order for an aircraft to have authorization to implement such RNP AR procedures, it is notably necessary to be able to eliminate an erroneous source of computing guidance instructions (or commands) from the guidance loop in order to counter its possible effects on the trajectory of the aircraft.

In order to be able to implement an operation of the RNP 0.1 type, the flight management assembly must make it possible to comply with a severity of the "hazardous" (dangerous) type in the case of loss of or error in the guidance commands. Moreover, it is necessary that, in the case of detection of an incorrect calculation, the aircraft can continue to be guided in automatic mode in order to be kept in the RNP corridor.

With a flight management assembly having two flight management systems, in the case of disagreement between then two flight management systems, the assembly is not capable of identifying which one is defective and the aircraft can therefore no longer be guided in automatic mode. Such an aircraft is not therefore authorized to implement such RNP AR operations.

SUMMARY

One purpose of the present disclosure is to overcome this disadvantage. The disclosure herein relates to a flight management assembly for an aircraft, making it possible to implement RNP AR operations such as mentioned above, the flight management assembly comprising two guidance systems, each guidance system provided with a flight management system, the flight management systems being independent, and hosted in different equipment, each of the flight management systems being configured for carrying out, in real time, at least a calculation of guidance commands for the aircraft, the guidance commands comprising at least a roll command, the flight management assembly also comprising at least one monitoring unit configured for carrying out monitorings of data generated by the flight management systems in such a way as to be able to detect an inconsistency.

According to the disclosure herein:
the flight management assembly comprises at least one data generating unit, different from the flight management systems, the data generating unit being configured for calculating, in real time, a roll command; and
the monitoring unit is configured for, at least in the case of detection of an inconsistency in the data of the flight management systems, carrying out a comparison of the roll commands calculated by the two flight management systems with the roll command determined by the data generating unit in such a way as to be able to detect and identify, if applicable, a defective flight management system among the two flight management systems.

Thus, thanks to the taking into account of a roll command calculated by the data generating unit, different from the flight management systems and described in detail below, the monitoring unit is capable of identifying a defective flight management system in order to make it possible to guide the aircraft using a non-defective flight management system which, as described below, allows the aircraft to have the capability of flying operations of the RNP type and to overcome the aforesaid disadvantage.

Preferably, the data generating unit forms part of a guidance computer of the aircraft.

In a preferred embodiment, the monitoring unit is configured:

- for calculating a first difference between the roll command calculated by one of the first flight management systems and the corresponding roll command calculated by the data generating unit and for comparing this first difference with the first predetermined margin;
- for calculating a second difference between the roll command calculated by the other one of the flight management systems and the corresponding roll command calculated by the data generating unit and for comparing this second difference with the first margin; and
- if only one of the first and second differences is greater than the first margin, for determining the corresponding roll command as being inconsistent and for detecting and identifying, as defective, the flight management system having calculated that inconsistent roll command.

Moreover, advantageously:

- the data generating unit is configured for calculating the roll command, using a usual route-following law of the "Track" type; and
- the flight management systems are configured for calculating the guidance commands comprising at least one roll command, using a usual law of following a horizontal trajectory of the "Hpath" type.

Advantageously, for calculating the roll command in real time, the data generating unit is configured for, successively:

- identifying, as a function of a current position of the aircraft, a leg called the active leg of the flight plan, towards which the aircraft must be guided;
- as a function of the position of the aircraft with respect to the active leg, of a speed vector direction of the aircraft and of a direction of the active leg, determining a succession of routes to follow in order to capture the active leg; and
- from the route determined for the current moment of time, calculating the corresponding roll command.

Moreover, advantageously, the guidance of the aircraft is carried out according to data supplied by one of the two guidance systems, called the active guidance system, and the flight management assembly comprises switching configured for, in the case of detection by the monitoring unit of a defective flight management system and if the active guidance system is the one comprising this defective flight management system, generating a switching consisting of or comprising activating the other one of the two guidance systems.

Moreover, in a particular embodiment, the flight management assembly comprises two monitoring units configured for carrying out the same monitorings.

The present disclosure also relates to a method for monitoring a flight management assembly such as described above, that is to say comprising two guidance systems, each one provided with a flight management system, the flight management systems being independent and hosted in different equipment, each one of the flight management systems being configured for carrying out at least one calculation of guidance commands for the aircraft, the guidance commands comprising at least one roll command, the monitoring method comprising a monitoring step consisting of or comprising carrying out monitorings of data generated by the flight management systems in such a way as to be able to detect an inconsistency.

According to the disclosure herein:

- the monitoring method comprises a step of generation of data consisting of or comprising calculating, in real time, a roll command, with the help of at least one data generating unit, different from the flight management systems; and
- the monitoring step consists of or comprises carrying out, at least in the case of detection of an inconsistency in the data of the flight management systems, a comparison of the roll commands calculated by the two flight management systems and the roll command determined in the data generating step in such a way as to be able to detect and identify, if applicable, a defective flight management system among the two flight management systems.

Advantageously, the monitoring step consists of or comprises:

- calculating a first difference between the roll command calculated by one of the flight management systems and the corresponding roll command calculated by the data generating unit and of comparing this first difference with a first predetermined margin;
- calculating a second difference between the roll command calculated by the other one of the flight management systems and the corresponding roll command calculated by the data generating unit and of comparing this second difference with the first margin; and
- if only one of the first and second differences is greater than the first margin, of determining the corresponding roll command as being inconsistent and of detecting and identifying, as defective, the flight management system having calculated this inconsistent guidance command.

The present disclosure also relates to an aircraft, in particular to a transport aircraft, which is provided with a flight management assembly such as the one specified above.

BRIEF DESCRIPTION OF THE DRAWINGS

The appended figures will give a good understanding of how the disclosure herein can be embodied. In these figures, identical references denote similar elements.

DETAILED DESCRIPTION

Figure 1:
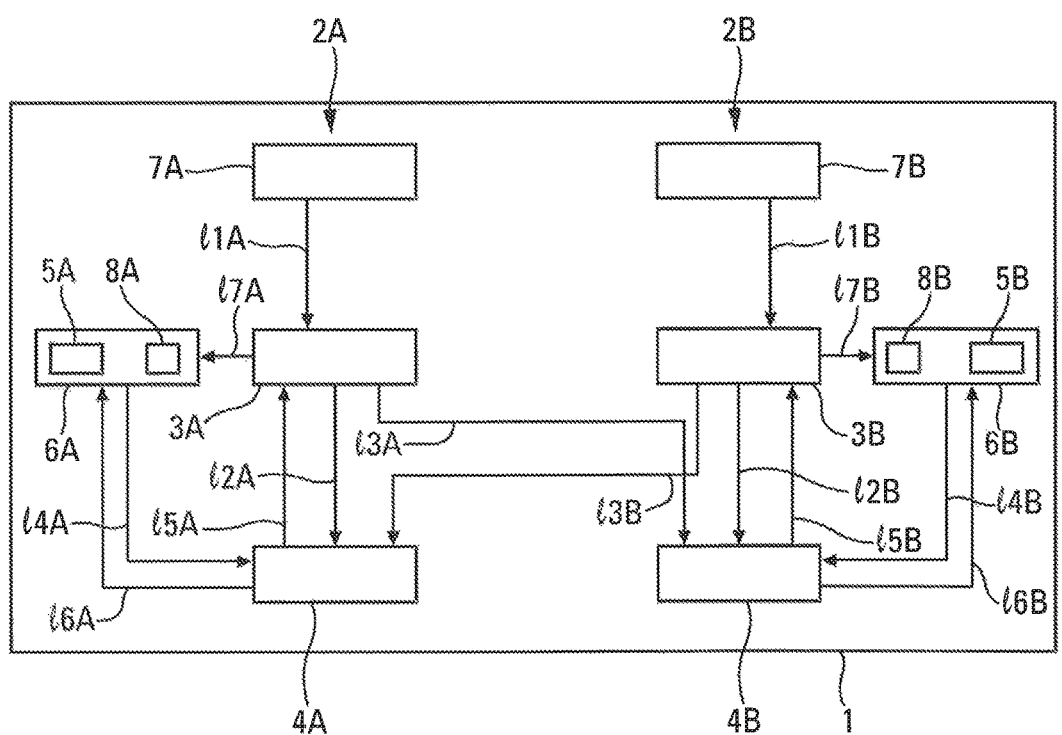
FIG. 1 is a block diagram of a one embodiment of a flight management assembly of an aircraft.

FIG. 1 is a block diagram of a flight management assembly 1 of an aircraft, in particular of a transport aircraft, which makes it possible to illustrate the disclosure herein.

This flight management assembly 1, which is installed in the aircraft, comprises two guidance systems 2A and 2B each provided with a flight management system 3A and 3B of the FMS (Flight Management System) type. The two flight management systems 3A and 3B are independent and are hosted in different equipment (items of hardware).

Each of the flight management systems 3A and 3B is configured for carrying out calculations described below and notably a calculation of guidance commands for the aircraft, these guidance commands comprising a roll command.

The guidance of the aircraft is carried out according to data (and notably to guidance commands) supplied by just one of the two guidance systems 2A and 2B, called the active guidance system.

The flight management assembly 1 also comprises at least one monitoring unit 4A, 4B configured for carrying out monitorings of data generated by the flight management systems 3A and 3B in such a way as to be able to detect an inconsistency.

The monitoring unit 4A, 4B is hosted in and item of equipment (hardware) different from the equipment hosting the two flight management systems 3A and 3B.

According to the disclosure herein, the monitoring unit 4A, 4B is configured for carrying out a monitoring of the guidance commands (or instructions) calculated by the two flight management systems 3A and 3B in such a way as to be able to detect and identify, if applicable, a defective flight management system from among the flight management systems 3A and 3B, as described below.

"Defective flight management system" is understood to be a flight management system which calculates and transmits at least one guidance command that is erroneous (or incorrect).

More precisely, according to the disclosure herein:
the flight management assembly 1 comprises at least one data generating unit 5A, 5B, different from the flight management systems 3A and 3B, the data generating unit 5A, 5B being configured for calculating a roll command in real time; and
the monitoring unit 4A, 4B is configured for carrying out a comparison of the roll commands calculated by the two flight management systems 3A and 3B with the roll command determined by the data generating unit 5A, 5B in such a way as to be able to detect and identify, if applicable, a defective flight management system among the two flight management systems 3A and 3B.

In a preferred embodiment, the data generating unit 5A, 5B corresponds to a guidance computer of the aircraft or, as shown in FIG. 1, forms part of a guidance computer 6A, 6B of the aircraft. In a variant embodiment (not shown), the data generating unit 5A, 5B can also be installed in an item of equipment other than the guidance computer 6A, 6B.

Thus, thanks to the taking into account of a roll command calculated by the data generating unit 5A, 5B, different from the flight management systems 3A and 3B and described below, the monitoring unit 4A, 4B is capable of identifying a defective flight management system.

The monitoring unit 4A, 4B is thus capable of isolating a defective flight management system in order to allow the crew to carry out an RNP operation.

In order to be able to identify, if applicable, which of the two flight management systems 3A and 3B is erroneous, the monitoring unit 4A, 4B monitors the roll commands received from the flight management systems 3A and 3B and from the data generating unit 5A, 5B and carries out comparisons.

Different comparisons can be envisaged in the context of the present disclosure.

In a particular embodiment, the monitoring unit 4A, 4B is configured for detecting an inconsistency between the two flight management systems 3A and 3B:
by calculating the difference between the roll command calculated by one of the flight management systems and the corresponding command calculated by the other one of the flight management systems;
by comparing this difference with a predetermined comparison margin; and
by considering the data as being inconsistent if this difference is greater than the comparison margin.

Moreover, in a preferred embodiment, the monitoring unit 4A, 4B is configured:
for calculating a first difference between the roll command calculated by one of the flight management systems 3A and 3B and the corresponding roll command calculated by the data generating unit 5A, 5B and for comparing this first difference with a predetermined margin (equal to or different from the aforesaid comparison margin);
for calculating a second difference between the roll command calculated by the other one of the flight management systems 3A and 3B and the corresponding roll command calculated by the data generating unit 5A, 5B and for comparing this second difference with the aforesaid margin; and
if one of the first and second differences (and only one of them) is greater than the margin, for determining the corresponding roll command as being inconsistent and for detecting and identifying, as being defective, the flight management system having calculated that inconsistent guidance command.

As described below for a particular example, in order to calculate the roll command in real time, the data generating unit 5A, 5B is configured for, successively:
identifying, as a function of a current position of the aircraft, a so-called active leg of the flight plan, towards which the aircraft must be guided;
as a function of the position de the aircraft with respect to the active leg, of a speed vector direction of the aircraft and of a direction of the active leg, determining a succession of routes to follow in order to capture the active leg; and
from the route determined for the current moment of time, calculating the corresponding roll command.

The flight management systems 3A and 3B are configured for calculating, in a usual way, the roll commands, using a usual law of the "Hpath" type (following a horizontal trajectory").

Figure 2:
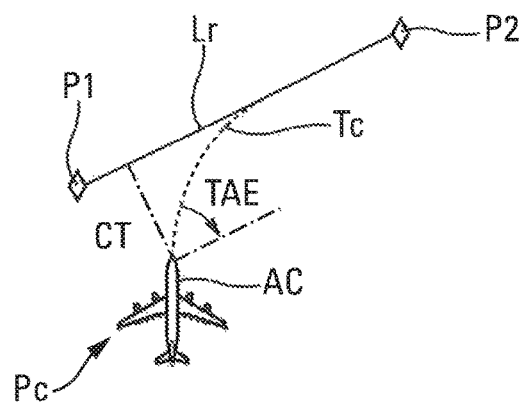
FIGS. 2 through 4 are diagrams illustrating an aircraft flying a flight trajectory, for the purpose of capturing a trajectory leg, for different types of guidance respectively, making it possible to illustrate important features of the disclosure herein.

In the usual way, the "Hpath" law uses a CT (Cross Track) route error and an angular route deviation TAE (Track Angle Error) calculated from the position Pc of the aircraft AC and from the trajectory to be followed, as shown in FIG. 2.

More precisely:
the CT (Cross Track) route error is the distance between the center of gravity of the aircraft AC and the trajectory of the leg Lr followed (which is defined between two waypoints P1 and P2);
the TAE (Track Angle Error) angular route deviation is the angle between the direction of the segment of trajectory or the leg (with respect to North) and that of the speed vector of the aircraft AC;
the legs are the elementary pieces of the flight plan (comprising waypoints to be joined and the way of joining these waypoints; and
the segments are pieces or parts of trajectories (bits of straight line, arcs of circle).

Moreover, a leg of the TF type is a leg such as the leg Lr in FIG. 2 which connects two points P1 and P2 of the flight plan with a straight line. It is defined by its direction, its length and the coordinates of the final point P2. It is fixed (with respect to the ground), unlike other types of legs called floating legs which are defined by a direction but not by the final point, for example an axis to be intercepted.

In the usual way, on an aircraft, the "Hpath" law is used via a usual guidance mode of the NAV type (namely a following of the trajectory calculated by the flight management system 3A, 3B on the basis of the flight plan entered by the crew).

Moreover, the data generating unit 5A, 5B is therefore part of a guidance computer 6A, 6B, and it is configured for calculating the roll command, with the help of a usual law of the "Track" type ("route following").

The "Track" law is used manually by the crew (selected guidance mode) by entering the value of the desired route, with the help of a usual data input unit, of the FCU (Flight Control Unit) type.

The two flight management systems 3A and 3B use an "Hpath" law when the guidance mode selected by the crew is NAV (automatic following of the trajectory).

The "Track" law is thus one of the modes of the guidance computer 6A, 6B which the crew can select outside of the NAV mode (when selected), independently with respect to the trajectory generated by the flight management systems 3A and 3B.

The "Track" law makes it possible to slave the direction of the speed vector of the aircraft onto a desired direction (with respect to North). By way of illustration, if it is desired to fly the aircraft towards the East for example, the "Track" law can be used by requesting it to slave the direction of the speed vector of the aircraft onto the heading of 90°.

The "Track" law which defines a roll command proportional to the route deviation, that is to say to the difference between the current route of the aircraft (trajectory Tc in FIG. 3) and the target route (leg Li), is simple and it is independent of the laws of the "HPATH" type used by the flight management systems.

Figure 3:
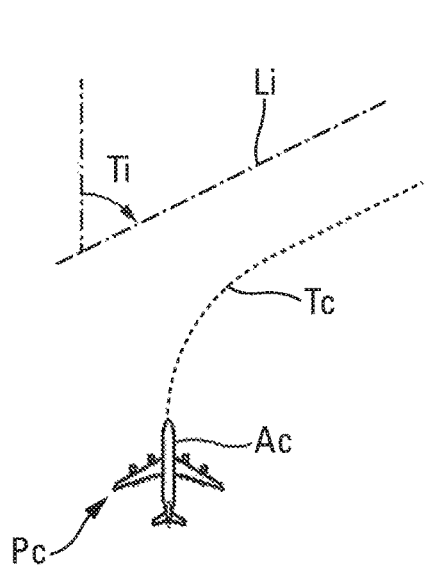

This "Track" law is generally already available on the aircraft and then its sole purpose is to slave the axis of the speed vector of the aircraft AC onto the target route, as illustrated by a target route Ti in FIG. 3. Thus the ground trajectory varies as a function of the initial state of the aircraft, which does not make it possible to follow fixed legs which are current trajectory legs in a flight plan. The aircraft can therefore find itself on a trajectory Tc parallel to the leg Li without converging towards it.

Figure 4:
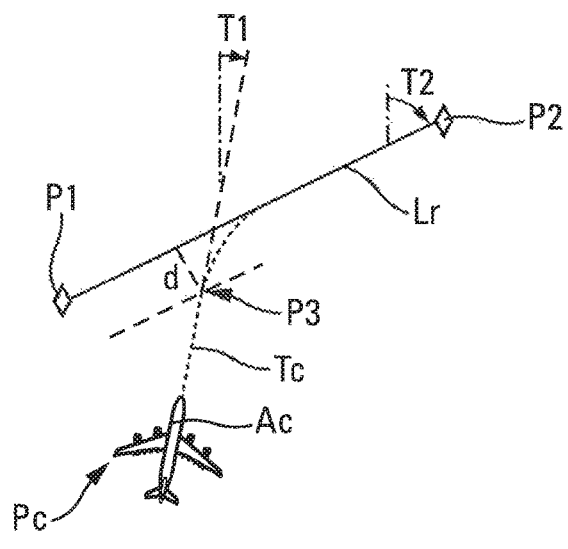

In order to capture a leg Lr, as shown in FIG. 4, the flight management assembly 1 calculates a succession of routes T1, T2 to follow making it possible to capture that leg Lr. These routes T1 and T2 are sent to the guidance computer 6A, 6B whilst requesting it to follow them using the "Track" law.

Before a point P3, the route followed is T1 and, after the point P3, the route followed is T2+ε. ε depends on the CT (Cross Track) route error. ε is a small angular increment for ensuring that the aircraft AC converges correctly towards the leg Lr. The "Track" law takes account only of the direction of the speed vector of the aircraft. In order to prevent the aircraft from following T2 parallel to the leg, a slightly different command is calculated in order to make it converge if it is not strictly on the leg. A function called "calculation and sequencing of Track commands" which is for example part of the data generating unit 5A, 5B, calculates these items of information as a function of the position of the aircraft AC, of the direction of the speed vector of the aircraft AC, and of the direction of the leg Lr to be captured.

A distance d is considered which corresponds to the distance at which the function commands the change from the first command (route T1) to the second command (route T2). This distance d is a function of the speed of the aircraft and of the difference between the values of T1 and T2.

Algorithms, which are for example part of the data generating unit 5A, 5B, calculate the values of the routes T1 and T2 as a function of parameters of the aircraft AC, and send them to the guidance computer 6A, 6B at the correct time, so that the "Track" law of the guidance computer 6A, 6B calculates the roll commands which make it possible to bring the aircraft onto the leg Lr.

The algorithms used for this purpose depend on the type of leg in question:
  for a TF leg, the distance d is equal to the sum of the turn radius at a nominal roll angle (equal to the change of heading limited to 25° for reasons of passenger comfort) and of the distance traveled at the speed of the aircraft during the roll time, all projected onto the normal to the direction of the leg;
  for the other types of leg, the algorithms generate a profile of route commands as a function of the time and state of the aircraft which best approximate to the behavior of the aircraft if it were guided using the "Hpath" law.

In a particular embodiment, the implementation is as follows for this example:
  the two flight management systems 3A and 3B extract the RNP-AR procedure from the database and insert it into the flight plan. Each of the flight management systems 3A and 3B calculate a CRC (Cyclic Redundancy Check) code over this flight plan, and the flight management system called "master" (of the active system) sends the flight plan and the CRC code to the monitoring unit 4A, 4B, whereas the second flight management system sends only the CRC code of the flight plan that it has calculated. The two CRC codes are compared by the monitoring unit 4A, 4B which validates the flight plan received from the master flight management system if the two CRC codes are identical;
  the monitoring unit 4A, 4B (or the data generating unit 5A, 5B) sequences the legs of the flight plan as a function of the position of the aircraft, which consists of or comprises identifying, in the sequence of legs of the flight plan, the one upon which the aircraft must be guided;
  as a function of the position of the aircraft with respect to the active leg, of the direction of the speed vector of the aircraft and of that of the active leg, the "calculation and sequencing of Track commands" function determines the succession of the routes to follow in order to capture the leg, as shown in FIG. 4.

In the preferred embodiment, shown in FIG. 1, the flight management assembly 1 comprises two monitoring units 4A and 4B which are configured for carrying out the same monitorings. In the case of a failure of one of these monitoring units 4A and 4B during an RNP operation, this nevertheless makes it possible to be able to detect, if applicable, a defective flight management system 3A or 3B, and therefore to ensure the integrity required for this type of RNP operation.

Moreover, the flight management assembly 1 comprises communication configured, in the case of detection by the monitoring unit 4A, 4B of a defective flight management system (for example the flight management system 3A) and if the active guidance system is the one comprising that defective flight management system (the guidance system 2A in this example), for generating switching consisting of or comprising activating the other one of the two guidance systems 2A and 2B (namely the guidance system 2B in this example).

In a particular embodiment, the switching comprises a button (not shown) which is installed in the cockpit and which allows a crew member to control the switching manually. Moreover, in a variant embodiment, the control comprises at least one control unit 8A, 8B which is installed in a guidance computer 6A, 6B and which carries out the switching as a function of a monitoring status received.

As shown in FIG. 1, each guidance system 2A, 2B comprises a set 7A, 7B of information sources notably comprising usual sensors for determining (measuring, calculating, . . . ) the values of parameters related to the state (position, speed, . . . ) of the aircraft and to its environment (temperature, . . . ). The set 7A, 7B can also comprise a navigation database of the NDB (Navigation Data Base) type which contains in particular the definition of the RNP-AR procedures used.

These values and items of information are supplied via a link l1A, l1B from the set 7A, 7B to the corresponding flight management system 3A, 3B ("corresponding" signifying which forms part of the same guidance system 2A, 2B).

In the usual manner, each of the flight management systems 3A and 3B calculates, notably on the basis of values and information received from the corresponding set 7A, 7B, the position of the aircraft, the trajectory of the aircraft, the difference between the position and the trajectory of the aircraft, and guidance commands and notably roll commands in order to slave the position of the aircraft onto the trajectory.

The flight management assembly 1 therefore also comprises the data generating unit 5A, 5B which calculates a third roll command. This data generating unit 5A, 5B serves as a third data source for the purpose of a comparison and of a choice in the monitoring unit 4A, 4B. This data generating unit 5A, 5B carries out only the indicated calculations and operations and does not correspond to a (third) flight management system.

The monitoring unit 4A receives information from the flight management system 3A, from the flight management system 3B and from the data generating unit 5A, via the links l2A, l3B and l4A respectively, and can provide information to the corresponding flight management system 3A, via a link l5A. The monitoring unit 4A can also supply the results of monitorings used to the guidance computer 6A via a link l6A.

Similarly, the monitoring unit 4B receives information from the flight management system 3A, from the flight management system 3B and from the data generating unit 5B, via the links l2A, l3B, and l4B respectively, and can provide information to the corresponding flight management system 3B, via a link l5B. The monitoring unit 4B can also provide the results of monitorings used to the guidance computer 6B via a link l6B.

As shown in FIG. 1, each one of the two guidance systems 2A and 2B of the flight management assembly 1 comprises a guidance computer 6A, 6B of the FG (Flight Guidance) type. One of the guidance computers 6A and 6B, namely the guidance computer of the active guidance system, manages the usual servo-controls of the aircraft's control surfaces in order to guide the aircraft in accordance with the guidance commands. The logic for selection between the guidance computer 6A and the guidance computer 6B, for managing the servo-controls and guiding the aircraft, can be implemented at the level of these guidance computers 6A and 6B in the usual way via the usual communication units 8A and 8B.

The functioning of the monitoring carried out by the flight management assembly 1 is described in detail below.

In the case of inconsistency detected between the data generated by the flight management systems 3A and 3B, the monitoring implemented by the monitoring units 4A and 4B, is based on the analysis of the roll commands.

In order to do this, each of the monitoring units 4A and 4B implements the following successive steps, consisting of or comprising:

E1) calculating a first difference between the roll command calculated by one of the flight management systems and the corresponding roll command calculated using the data generating unit and of comparing this first difference with a first predetermined margin;

E2) calculating a second difference between the roll command calculated by the other one of the flight management systems and the corresponding roll command calculated using the data generating unit and of comparing this second difference with the first margin; and E3) if only one of the first and second differences is greater than the first margin, of determining the corresponding roll command as being inconsistent, and of detecting and identifying the flight management system having calculated that inconsistent guidance command as being defective.

A method (used by the flight management assembly 1) for monitoring the guidance commands coming from the flight management systems 3A and 3B which is fast, simple, inexpensive and efficient is thus obtained.

The flight management assembly 1, such as described above, therefore has an architecture based on two flight management systems 3A and 3B and on a monitoring of roll commands (implemented notably by the monitoring units 4A and 4B), in order to be able to implement operations of the RNP 0.1 type.

This flight management assembly 1 thus makes it possible:

to obtain a fast response time;

to identify, if applicable, a defective flight management system (in the case of calculation of erroneous roll commands) making it possible to invalidate the defective flight management system and to continue the operation on the flight management system that has not failed and, if possible, to resynchronize the defective flight management system with the non-defective flight management system; and to avoid having to install a third flight management system (to serve as a third source of choice), which would be expensive and complicated.

It will be noted that the "Hpath" law uses route error and angular deviation values calculated from the position of the aircraft and from the trajectory to be followed. If it is desired to use a third "Hpath" law for the monitoring function, it would be necessary to calculate a trajectory on the basis of the consolidated flight plan received from the two flight management systems and to receive the position of the aircraft in order to calculate the route error and the route angular deviation, which would amount to using a third and hardly simplified flight management system. Thus, by using the "Track" law of the guidance computer for calculating the third guidance command more simply (by being based solely on the flight plan, it is not necessary to calculate a trajectory and, moreover, the "Track" law is generally already available in the aircraft), the flight management assembly can identify which of the two flight management systems is erroneous when the two of them send inconsistent commands.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight management assembly for an aircraft, the flight management assembly comprising:
   two guidance systems, each of the two guidance systems comprising a flight management system, wherein each flight management system is independent and hosted in different equipment, wherein each flight management system is configured to carry out, in real time, at least one calculation of guidance commands for the aircraft, and wherein the guidance commands comprise at least a roll command;
   at least one data generating unit, different from the flight management system of each of the two guidance systems, wherein the at least one data generating unit is configured to calculate, in real time, a calculated roll command;
   at least one monitoring unit configured to monitor data generated by the flight management system of each of the two guidance systems to detect an inconsistency, wherein the at least one monitoring unit is configured to, when an inconsistency in the data of the flight management system of one of the two guidance systems is detected, compare the roll commands from the flight management systems with the calculated roll command from the data generating unit to detect and identify a flight management system among the two guidance systems as being defective; and
   a switch configured to activate, when the at least one monitoring unit detects a defective flight management system and the defective flight management system is associated with an active guidance system, another of the two guidance systems having a non-defective flight management system;
   wherein the at least one data generating unit comprises a part of a guidance computer of the aircraft; and
   wherein at least one of the two guidance systems having the non-defective flight management system is configured to guide the aircraft according to the guidance commands.

2. The flight management assembly of claim 1,
   wherein the two flight management systems comprise a first flight management system and a second flight management system; and
   wherein the at least one monitoring unit is configured to:
      calculate a first difference between the roll command calculated by the first flight management system and the calculated roll command from the at least one data generating unit and compare the first difference with a first predetermined margin;
      calculate a second difference between the roll command calculated by the second flight management system and the calculated roll command from the at least one data generating unit and compare the second difference with the first predetermined margin; and
      determine, when only one of the first and second differences is greater than the first predetermined margin, the roll command from the first or the second flight management systems as being an inconsistent roll command, detect which of the two flight management systems have the inconsistent roll command, and identify which of the two flight management systems calculated the inconsistent roll command.

3. The flight management assembly of claim 1, wherein:
   the at least one data generating unit is configured to calculate the calculated roll command using a route-following law; and
   the two flight management systems are configured to calculate the guidance commands comprising the roll command, using a law of following a horizontal trajectory.

4. The flight management assembly of claim 1, wherein, to calculate the calculated roll command in real time, the at least one data generating unit is configured to, successively:
   identify, as a function of a current position of the aircraft, a leg called an active leg of the flight plan, towards which the aircraft must be guided;
   determine a succession of routes to follow in order to capture the active leg as a function of: the current position of the aircraft with respect to the active leg, a speed vector direction of the aircraft, and a direction of the active leg; and
   calculate the calculated roll command from the route determined for a current moment of time.

5. The flight management assembly of claim 1, wherein the at least one monitoring unit comprises
   two monitoring units configured to monitor the data generated by the flight management systems.

6. A method for monitoring a flight management assembly of an aircraft, the flight management assembly comprising:
   two guidance systems, each of the two guidance systems comprising a flight management system, wherein each flight management system is independent and hosted in different equipment, wherein each flight management system is configured to carry out at least one calculation of guidance commands for the aircraft, and wherein the guidance commands comprise at least one roll command, the method comprising:

calculating, in real time, a calculated roll command using at least one data generating unit, wherein the at least one generating unit is different from the flight management systems;

monitoring data generated by the flight management systems to detect an inconsistency in the data of the flight management system;

comparing, when the inconsistency in the data of the flight management system of one of the two guidance systems is detected, the roll commands from the flight management systems with the calculated roll command from the at least one data generating unit to detect and identify flight management system among the two guidance systems as being defective;

activing, using a switch, another of the two guidance systems having a non-defective flight management system when the at least one monitoring unit detects a defective flight management system and the defective flight management system is associated with an active guidance system; and guiding, using at least one of the two guidance systems having the non-defective flight management system, the aircraft according to the guidance commands.

7. The method of claim 6, wherein:

the two flight management systems comprise a first flight management system and a second flight management system; and monitoring data generated by the flight management systems to detect an inconsistency comprises:
calculating a first difference between the roll command calculated by the first flight management system and the calculated roll command from the at least one data generating unit and comparing the first difference with a first predetermined margin;
calculating a second difference between the roll command calculated by the second flight management system and the calculated roll command from the at least one data generating unit and comparing the second difference with the first predetermined margin; and
determining, when only one of the first and second differences is greater than the first predetermined margin, the roll command from the first of the second flight management systems as being an inconsistent roll command, detecting which of the two flight management systems have the inconsistent roll command, and identify which of the two flight management systems calculated the inconsistent roll command.

8. The method of claim 6, wherein:

the calculated roll command is calculated by the at least one data generating unit using a route-following law; and the guidance commands comprising the roll command are calculated by the two flight management systems using a law of following a horizontal trajectory.

9. The method of claim 6, comprising, using the at least one data generating unit to calculate the calculated roll command in real time, successively:
identifying, as a function of a current position of the aircraft, a leg called an active leg of the flight plan, towards which the aircraft must be guided;
determining a succession of routes to follow in order to capture the active leg as a function of: the current position of the aircraft with respect to the active leg, a speed vector direction of the aircraft, and a direction of the active leg; and
calculating the calculated roll command from the route determined for a current moment of time.

10. The method of claim 6, wherein the at least one monitoring unit comprises two monitoring units to monitor the data generated by the flight management systems.

11. An aircraft comprising a flight management assembly, the flight management assembly comprising:

two guidance systems, each of the two guidance systems comprising a flight management system, wherein each flight management system is independent and hosted in different equipment, wherein each flight management system is configured to carry out, in real time, at least one calculation of guidance commands for the aircraft, and wherein the guidance commands comprise at least a roll command;

at least one data generating unit, different from the flight management system of each of the two guidance systems, wherein the at least one data generating unit is configured to calculate, in real time, a calculated roll command, at least one monitoring unit configured to monitor data generated by the flight management system of each of the two guidance systems to detect an inconsistency, wherein the at least one monitoring unit is configured to, when an inconsistency in the data of the flight management system of one of the two guidance systems is detected, compare the roll commands from the flight management systems with the calculated roll command from the data generating unit to detect and identify a flight management system among the two guidance systems as being defective; and a switch configured to activate, when the at least one monitoring unit detects a defective flight management system and the defective flight management system is associated with an active guidance system, another of the two guidance systems having a non-defective flight management system;

wherein the at least one data generating unit comprises a part of a guidance computer of the aircraft; and wherein at least one of the two guidance systems having the non-defective flight management system is configured to guide the aircraft according to the guidance commands.

12. The aircraft of claim 11, wherein the two flight management systems comprise a first flight management system and a second flight management system; and wherein the at least one monitoring unit is configured to:
calculate a first difference between the roll command calculated by the first flight management system and the calculated roll command from the at least one data generating unit and compare the first difference with a first predetermined margin;
calculate a second difference between the roll command calculated by the second flight management system and the calculated roll command from the at least one data generating unit and compare the second difference with the first predetermined margin; and
determine, when only one of the first and second differences is greater than the first predetermined margin, the roll command from the first or the second flight management systems as being an inconsistent roll command, detect which of the two flight management systems have the inconsistent roll command, and identify which of the two flight management systems calculated the inconsistent roll command.

13. The aircraft of claim 11, wherein:
the at least one data generating unit is configured to calculate the calculated roll command using a route-following law; and
the two flight management systems are configured to calculate the guidance commands comprising the roll command, using a law of following a horizontal trajectory.

14. The aircraft of claim 11,
wherein, to calculate the calculated roll command in real time, the at least one data generating unit is configured to, successively:
  identify, as a function of a current position of the aircraft, a leg called an active leg of the flight plan, towards which the aircraft must be guided;
  determine a succession of routes to follow in order to capture the active leg as a function of: the current position of the aircraft with respect to the active leg, a speed vector direction of the aircraft, and a direction of the active leg; and
  calculate the calculated roll command from the route determined for a current moment of time.

15. The aircraft of claim 11, wherein the at least one monitoring unit comprises two monitoring units configured to monitor the data generated by the flight management systems.

* * * * *